United States Patent
Kuber et al.

(10) Patent No.: US 8,380,670 B2
(45) Date of Patent: *Feb. 19, 2013

(54) OPENING DOCUMENT STORED AT MULTIPLE DATABASE REPLICAS

(75) Inventors: Pranav Anand Kuber, Pune (IN); Kannepalli Venkata Sreekanth, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,563

(22) Filed: Apr. 5, 2012

(65) Prior Publication Data

US 2012/0191648 A1    Jul. 26, 2012

Related U.S. Application Data

(62) Division of application No. 12/334,941, filed on Dec. 15, 2008, now Pat. No. 8,229,890.

(51) Int. Cl.
    G06F 17/30    (2006.01)
(52) U.S. Cl. ...................................................... 707/637
(58) Field of Classification Search .................. 707/713, 707/637
    See application file for complete search history.

(56) References Cited

U.S. PATENT DOCUMENTS

| | | | | |
|---|---|---|---|---|
| 3,623,001 A * | 11/1971 | Kleist et al. | ..................... | 710/43 |
| 5,867,706 A * | 2/1999 | Martin et al. | ................. | 718/105 |
| 6,226,783 B1 * | 5/2001 | Limondin et al. | ............ | 717/104 |
| 6,304,913 B1 * | 10/2001 | Rune | ........................... | 709/241 |
| 6,405,294 B1 * | 6/2002 | Hayter | ......................... | 711/162 |
| 6,438,592 B1 * | 8/2002 | Killian | ......................... | 709/224 |
| 6,606,643 B1 * | 8/2003 | Emens et al. | ................. | 709/203 |
| 6,760,775 B1 * | 7/2004 | Anerousis et al. | ............ | 709/238 |
| 6,823,374 B2 * | 11/2004 | Kausik et al. | ................. | 709/219 |
| 6,952,737 B1 * | 10/2005 | Coates et al. | ................. | 709/229 |
| 6,970,840 B1 * | 11/2005 | Yu et al. | ....................... | 705/27.1 |
| 7,089,448 B2 * | 8/2006 | Hinshaw et al. | ............. | 714/6.12 |
| 7,103,651 B2 * | 9/2006 | Bohannon et al. | ............ | 709/223 |
| 7,203,731 B1 * | 4/2007 | Coates et al. | ................. | 709/214 |
| 7,219,304 B1 * | 5/2007 | Kraenzel et al. | ............. | 715/755 |
| 7,266,555 B1 * | 9/2007 | Coates et al. | ................. | 707/827 |
| 7,266,556 B1 * | 9/2007 | Coates | ................ | 1/1 |
| 7,274,658 B2 * | 9/2007 | Bornstein et al. | ............. | 370/227 |
| 7,281,168 B1 * | 10/2007 | Coates et al. | ................... | 714/43 |
| 7,313,180 B2 * | 12/2007 | Harada et al. | ................. | 375/229 |
| 7,428,540 B1 * | 9/2008 | Coates et al. | ......................... | 1/1 |
| 7,506,034 B2 * | 3/2009 | Coates et al. | ................. | 709/219 |
| 7,523,092 B2 * | 4/2009 | Andreev et al. | ........................ | 1/1 |
| 7,543,000 B2 * | 6/2009 | Castro et al. | ......................... | 1/1 |
| 7,590,747 B2 * | 9/2009 | Coates et al. | ................. | 709/229 |

(Continued)

FOREIGN PATENT DOCUMENTS

| | | |
|---|---|---|
| JP | 2002007436 A | 1/2002 |
| JP | 2004192071 A | 7/2004 |

Primary Examiner — Mard Andrew X Radtke
(74) Attorney, Agent, or Firm — Hamilton, Brook, Smith & Reynolds, P.C.

(57) ABSTRACT

A document is stored at each of a number of database replicas communicatively connected with a newly created database replica. The newly created database replica stores an indicator for the document denoting the database replicas at which the document is stored. A probable time to retrieve the document from each database replica is retrievable from the newly created database replica. For each database replica, a real-time analysis of network parameters in relation to the database replica is able to be performed based on the probable time retrieved. This analysis yields an updated probable time to retrieve the document from the database replica. This enables the document to be retrieved from the database replica having the lowest updated probable time.

10 Claims, 4 Drawing Sheets

U.S. PATENT DOCUMENTS

| | | | |
|---|---|---|---|
| 7,600,014 B2* | 10/2009 | Russell et al. | 709/224 |
| 7,636,741 B2* | 12/2009 | Kulesza et al. | 1/1 |
| 7,716,367 B1* | 5/2010 | Leighton et al. | 709/244 |
| 7,797,739 B2* | 9/2010 | Andreev et al. | 726/16 |
| 2001/0047400 A1* | 11/2001 | Coates et al. | 709/219 |
| 2002/0078233 A1* | 6/2002 | Biliris et al. | 709/238 |
| 2002/0087725 A1* | 7/2002 | Cummings et al. | 709/243 |
| 2002/0099818 A1* | 7/2002 | Russell et al. | 709/224 |
| 2002/0112036 A1* | 8/2002 | Bohannon et al. | 709/220 |
| 2002/0116444 A1* | 8/2002 | Chaudhri et al. | 709/201 |
| 2002/0163882 A1* | 11/2002 | Bornstein et al. | 370/227 |
| 2003/0051172 A1* | 3/2003 | Lordemann et al. | 713/201 |
| 2003/0055979 A1* | 3/2003 | Cooley | 709/227 |
| 2003/0101231 A1* | 5/2003 | Kausik et al. | 709/217 |
| 2003/0149581 A1* | 8/2003 | Chaudhri et al. | 705/1 |
| 2004/0044791 A1* | 3/2004 | Pouzzner | 709/245 |
| 2004/0128442 A1* | 7/2004 | Hinshaw et al. | 711/114 |
| 2005/0105513 A1* | 5/2005 | Sullivan et al. | 370/352 |
| 2005/0246393 A1* | 11/2005 | Coates et al. | 707/200 |
| 2006/0129419 A1* | 6/2006 | Flaxer et al. | 705/1 |
| 2006/0218203 A1* | 9/2006 | Yamato et al. | 707/200 |
| 2007/0038755 A1* | 2/2007 | Sullivan et al. | 709/226 |
| 2007/0291739 A1* | 12/2007 | Sullivan et al. | 370/352 |
| 2008/0008089 A1* | 1/2008 | Bornstein et al. | 370/227 |
| 2008/0021898 A1 | 1/2008 | Hoglund | |
| 2008/0147974 A1* | 6/2008 | Madison et al. | 711/118 |
| 2008/0201413 A1* | 8/2008 | Sullivan et al. | 709/203 |
| 2008/0272188 A1* | 11/2008 | Keithley et al. | 235/379 |
| 2009/0037290 A1* | 2/2009 | Keithley et al. | 705/26 |
| 2009/0132543 A1* | 5/2009 | Chatley et al. | 707/10 |
| 2009/0138480 A1* | 5/2009 | Chatley et al. | 707/10 |
| 2009/0138481 A1* | 5/2009 | Chatley et al. | 707/10 |
| 2009/0144224 A1* | 6/2009 | Phan et al. | 707/1 |
| 2009/0144284 A1* | 6/2009 | Chatley et al. | 707/10 |
| 2009/0144285 A1* | 6/2009 | Chatley et al. | 707/10 |
| 2009/0144300 A1* | 6/2009 | Chatley et al. | 707/100 |
| 2009/0144416 A1* | 6/2009 | Chatley et al. | 709/224 |
| 2009/0144422 A1* | 6/2009 | Chatley et al. | 709/226 |

* cited by examiner

OPENING DOCUMENT STORED AT MULTIPLE DATABASE REPLICAS

RELATED APPLICATIONS

This application is a divisional application of U.S. application Ser. No. 12/334,941, filed Dec. 15, 2008. The entire teachings of the above application are incorporated herein by reference.

BACKGROUND

Data, which may be organized over a number of documents, can be persisted across multiple database replicas. The database replicas may be situated at different physical server locations, or may be situated at different local cache locations within the same server, where views permits a user to directly view the data from these locations. However, each view typically permits a user to view the data only from a specified location.

As such, a user has to select a view, and thus a given database replica, that best includes the data that the users wishes to see. For example, when a user opens a database replica, the underlying view typically only shows the documents stored within that database replica. To view documents stored at different database replicas, the user thus has to switch between views, and thus switch between database replicas, resulting in inconvenience to the user.

BRIEF SUMMARY

Embodiments of the present invention relate to opening a document stored at multiple database replicas. In a method according to one embodiment of the invention, a document is stored at each of a number of database replicas communicatively connected with a current database replica is desired to be opened. The current database replica is initially opened. The current database replica stores an indicator for the document denoting the database replicas at which the document is stored. A probable time to retrieve the document from one of the database replicas is retrieved from the current database replica. For each database replica, a real-time analysis of parameters in relation to the database replica is performed based on the probable time retrieved. This analysis yields an updated probable time to retrieve the document from the database replica. The document is thus retrieved over the from the database replica having the lowest updated probable time.

A method according to a further embodiment of the invention performs a database replication process to replicate a current database replica to a new database replica. For each document within the new database replica (as replicated from the current database replica), where the document is stored at one or more database replicas other than the new database replica (these database replicas being communicatively coupled to the new database replica), the following is performed. An indicator is stored within the new database replica for the document denoting the database replicas at which the document is stored. Also stored within the new database replica is a probable time to retrieve the document from one of the database replicas at which the document is stored.

A system of an embodiment of the invention includes a plurality of first database replicas at which a document is stored, as well as a second database replica. The second database replica is communicatively connected to the first database replicas. The second database replica is to store an indicator for the document denoting the first database replicas at which the document is stored, as well as a probable time for a client to retrieve the document from one of the first database replicas. The system may also include a client to open the second database replica and to permit a user to select the document at the second database replica to retrieve the document through the second database replica from one of the first database replicas.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
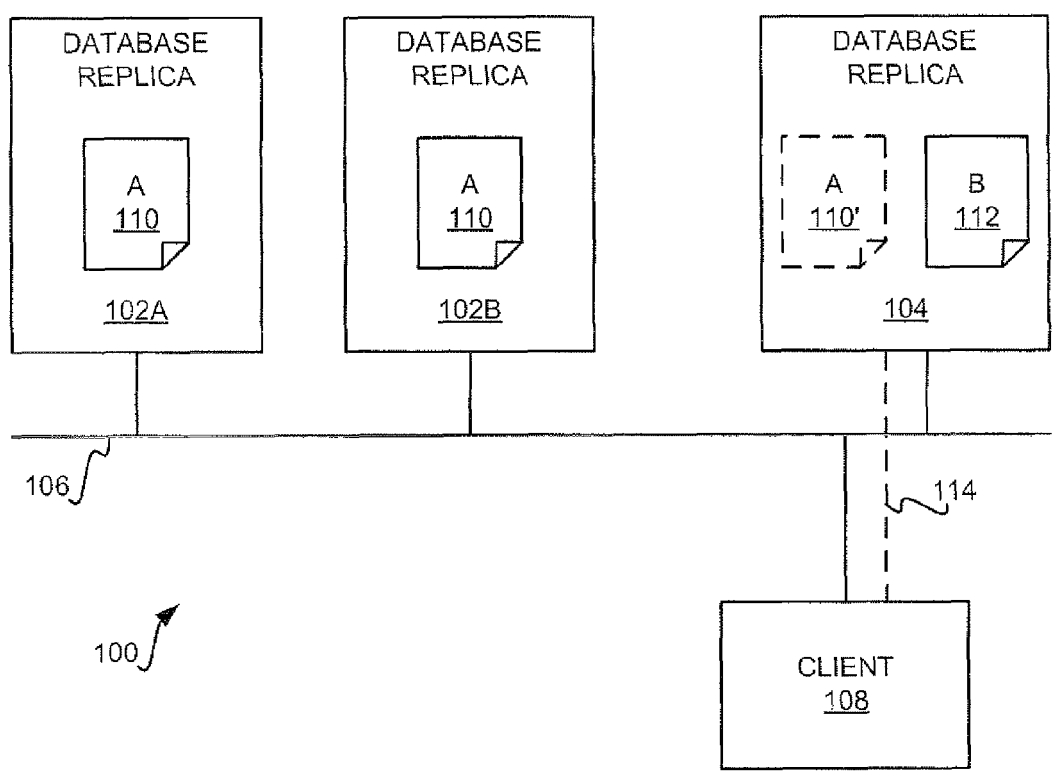
FIG. 1 is a diagram of a system, according to an embodiment of the invention.

FIG. 1 shows a system 100 (e.g., a computer system), according to an embodiment of the invention. The system 100 includes database replicas 102A and 102B, collectively referred to as the database replicas 102, as well as a database replica 104. The database replicas 102 and 104 are communicatively connected to one another, as indicated by the reference number 106. The system 100 may also include a client 108, which is also communicatively connected to the database replicas 102 and 104 as indicated by the reference number 106.

Each of the database replicas 102 and 104 is a replica of the same or a different database. In one embodiment, the database replicas 102 and 104 may each be stored at a different server location, such as at a server computing device at a different location. In this embodiment, the database replicas 102 and 104 may be communicatively interconnected with one another via one or more networks. In a further embodiment, the database replicas 102 and 104 may be stored at different local cache locations within the same server computing device at the same location. In either case, the server computing device may in actuality include a number of such computing devices, and/or can include processors, memory, storage devices, and the like.

Each of the database replicas 102 and 104 stores data organized over a number of documents, all of which are not particularly depicted in FIG. 1 for illustrative clarity and convenience. Therefore, as exemplarily shown in FIG. 1, the database replicas 102 both store a complete copy of the same document A, referred to by the reference number 110. By comparison, the database replica 104 is exemplarily depicted in FIG. 1 as storing a copy of the document B, referred to by the reference number 112. The database replica 104 also virtually stores a copy of the document A, as indicated by the reference number 110'. This means that the database replica 104 stores the actual locations at which the document A is stored, specifically the locations of the database replicas 102. Thus, in some embodiments of the invention, the database replica 104 does not actually store a copy of the document A, whereas in other embodiments, the database replica 104 can store a copy of the document A.

The client 108 may be a computing device, like a general-purpose computer having one or more processors, memory, storage devices, and so on. A user at the client 108 connects to the database replica 104, as indicated by the dotted line 114, and opens a view of all the documents accessible at the database replica 104. For instance, such a view may show that the documents A and B are accessible through the database replica 104. The user then selects a document to view. For exemplary purposes, it is said that the user selects the document A at the database replica 104, which is not actually stored at the database replica 104.

Therefore, the database replica 104 instructs the client 108 to retrieve the document A from one of the database replicas 102 at which the document A is actually stored. The manner by which one of the database replicas 102 is selected by the database replica 104, and how the database replica 104 effectively instructs the client 108 to retrieve the document A from the selected database replica, is described in detail later in the detailed description. In general, however, it is said that the database replica 104 selects one of the database replicas 102, and the client 108 retrieves the document A from the selected database replica.

Figure 2:
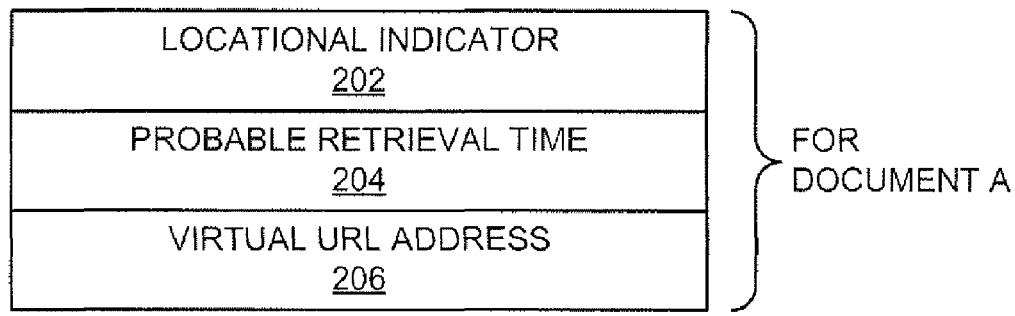
FIG. 2 is a diagram depicting the information stored at a database replica for a virtual document not actually stored at the database replica, according to an embodiment of the invention.

FIG. 2 shows the information 200 that the database replica 104 stores for the document A, according to an embodiment of the invention. The information 200 includes a locational indicator 202. The locational indicator 202 for the document A indicates that the document A is virtually (and not actually) stored at the database replica 104. The locational indicator 202 may further denote the database replicas at which the document A is actually stored, such as the database replicas 102.

The information 200 also includes a probable retrieval time 204. The probable retrieval time 204 is the probable time it takes for a client, such as the client 108, to retrieve the document A from at least one of the database replicas 102. In one embodiment, one probable retrieval time is stored within the database replica 104, specifically the lowest probable retrieval for the client 108 to retrieve the document A 110 from one of the database replicas 102 storing the document A. For example, if the probable retrieval time for the client 108 to retrieve the document A from the database replica 102A is X and the probable retrieval time for the client 108 to retrieve the document A from the database replica 102B is Y, and if Y is greater than X, then the probable retrieval time X is stored within the database replica 104 in this embodiment.

In a further embodiment, all the probable retrieval times for the database replicas 102 storing the document A are stored within the database replica 104. That is, not just the lowest probable retrieval time is stored within the database replica 104. For example, if the probable retrieval time for the client 108 to retrieve the document A from the database replica 102A is X and the probable retrieval time for the client 108 to retrieve the document A from the database replica 102B is Y, then both the probable retrieval times X and Y are stored within the database replica 104 in this embodiment. The time X is associated with the database replica 102A as stored within the database replica 104, and the time Y is associated with the database replica 102B as stored within the database replica 104.

The information 200 further includes a virtual universal resource locator (URL) address 206 for the document A. In general, each document stored by the database replica 104 includes an absolute and virtual URL address that denotes the actual location at which the document in question is stored at the database replica 104. This URL address is provided to the client 108. When the user opens such a document, the document is retrieved from the actual location specified by the URL address.

Therefore, instead of providing the client 108 with an absolute and real URL address that denotes the actual location at which the document A is stored—because the document A is not actually stored at the database replica 104—the virtual URL address 206 for the document A is instead provided to the client 108. When the user opens the document A, the virtual URL address 206 is replaced by the absolute and real URL address at which the document A is stored at one of the database replicas 102. Thus, the client 108 then retrieves the document A from the actual location specified by this replacement URL address.

In one embodiment, then, the database replica 104 may store the absolute and real URL addresses at which the document A is stored at the database replicas 102. This is so that one of these absolute URL addresses can replace the virtual URL address 206 provided to the client 108 when the user opens and thus retrieves the document A. The absolute URL addresses may be associated with their particular database replicas 102, and further may be stored as part of the locational indicator 202 in one embodiment of the invention.

Figure 3:
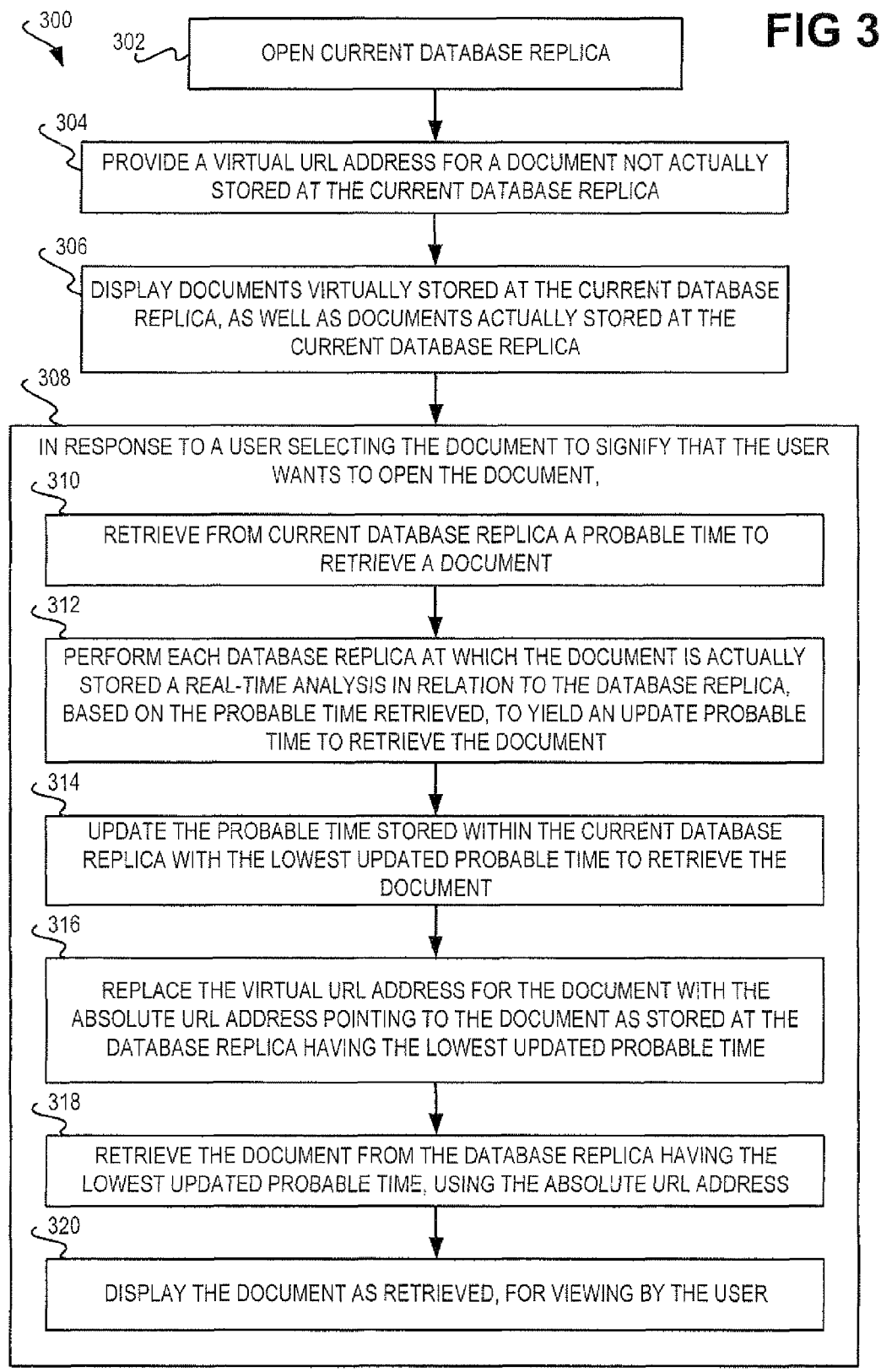
FIG. 3 is a flowchart of a method for opening a document virtually stored at a database replica, according to an embodiment of the invention.

FIG. 3 shows a method 300 for opening the document A, according to an embodiment of the invention. The method 300 can be performed by, and is described in relation to, the client 108. Alternatively, the method 300 may be implemented as one or more computer programs stored on a tangible computer-readable medium, such as a recordable data storage medium.

The client 108 connects to and opens a current database replica (302), which in the example of FIG. 1 is the database replica 104. The client 108 is provided by the database replica 104 with the virtual URL address 206 of the document A (304). The client 108 can display all the documents virtually stored at the database replica 104, as well as all the documents actually stored at the database replica 104 (306), where the latter may include the document B 112, for example. As displayed at the client 108, then, the documents available at or via the database replica 104 are viewable by a user of the client 108, within a current view defined by the database replica 104.

A user is permitted to select and ultimately for exemplary purposes does select the document A, signifying that the user wants to open the document A, and in response the following is performed (308). The probable time 204 to retrieve the document A from at least one of the database replicas 102 at which the document A is stored is retrieved (310). In one embodiment, where the probable time 204 to retrieve the document A from each of the database replicas 102 is stored at the database replica 104, the database replicas 102 may be sorted by their corresponding probable retrieval times 204.

For each database replica at which the document A is actually stored (i.e., for each of the database replicas 102), a real-time analysis is performed in relation to the database replica in question, based on the probable time 204, to yield an updated probable retrieval time to retrieve the document from this database replica (312). This analysis is performed in real-time in that it is not performed until after a user selects the document for opening. The analysis is performed based on one or more parameters, such as network parameters like ping times.

For example, it may be historically known that the retrieval time for a document is roughly equal to a percentage of the document's size, times the ping time between the client 108 and the database replica in question. Therefore, the client 108 pings each of the database replicas 102 one or more times, and arrives at an averaged ping time for each of the database replicas 102. The averaged ping time for each database replica is then multiplied by the predetermined percentage of the size of the document A, to arrive at a calculated retrieval time for the document A. This calculated retrieval time may then be averaged in a weighted manner with the retrieval time 204 retrieved from the database replica 104 for the document A to arrive at an updated retrieval time. For example, the updated retrieval time may be 80% of the calculated retrieval time plus 20% of the retrieval time 204 retrieved from the database replica 104.

Other approaches, such as statistical approaches, can also be employed. It is further noted that where just one probable retrieval time 204 has been retrieved from the database replica 104, the client 108 determines an updated retrieval time for each of the database replicas 102 based on this same retrieval time 204. By comparison, where a probable retrieval time 204 is retrieved from the database replica 104 for each of the database replicas 102, the client 108 determines an updated retrieval time for each database replica based on the retrieval time 204 for that database replica.

The probable time 204 stored within the current database replica 104 can be updated with (i.e., replaced by) at least the lowest updated probable retrieval time determined in part 312 (314). For example, where the database replica 104 stores just one probable time 204, the probable time 204 may be replaced with the lowest probable retrieval time determined in part 312. As another example, where the database replica 104 stores a probable retrieval time 204 for each of the database replicas 102, the updated probable retrieval time determined for each of the database replicas 102 replaces the previously stored and corresponding probable time 204 for the database replica in question, within the database replica 104.

The virtual URL address for the document A is replaced with the absolute URL address pointing to the document A as actually stored at the database replica having the lowest updated probable retrieval time (316). For example, the client 108 may have already been provided with the absolute URL addresses that can replace the virtual URL address. As another example, the client 108 may request the absolute URL address for the database replica having the lowest updated probable retrieval time, from the database replica 104. As a third example, the virtual URL address may point to the database replica 104, such that the client 108 requests the document A at this virtual URL address, and the database replica 104 in response to this request redirects the client 108 to the absolute URL address in question. That is, in this last example, it is the database replica 104 that replaces the virtual URL address with the absolute URL address, and not the client 108.

As such, ultimately the client 108 retrieves the document A from the database replica having the lowest updated probable time, using the appropriate absolute URL address (318). Once the document A has been retrieved, the client 108 may display the document A, so that it is viewable by the user that originally requested the document A (320). In this way, the document A is retrieved via the database replica 104, even though the database replica 104 does not store an actual copy of the document A.

Figure 4:
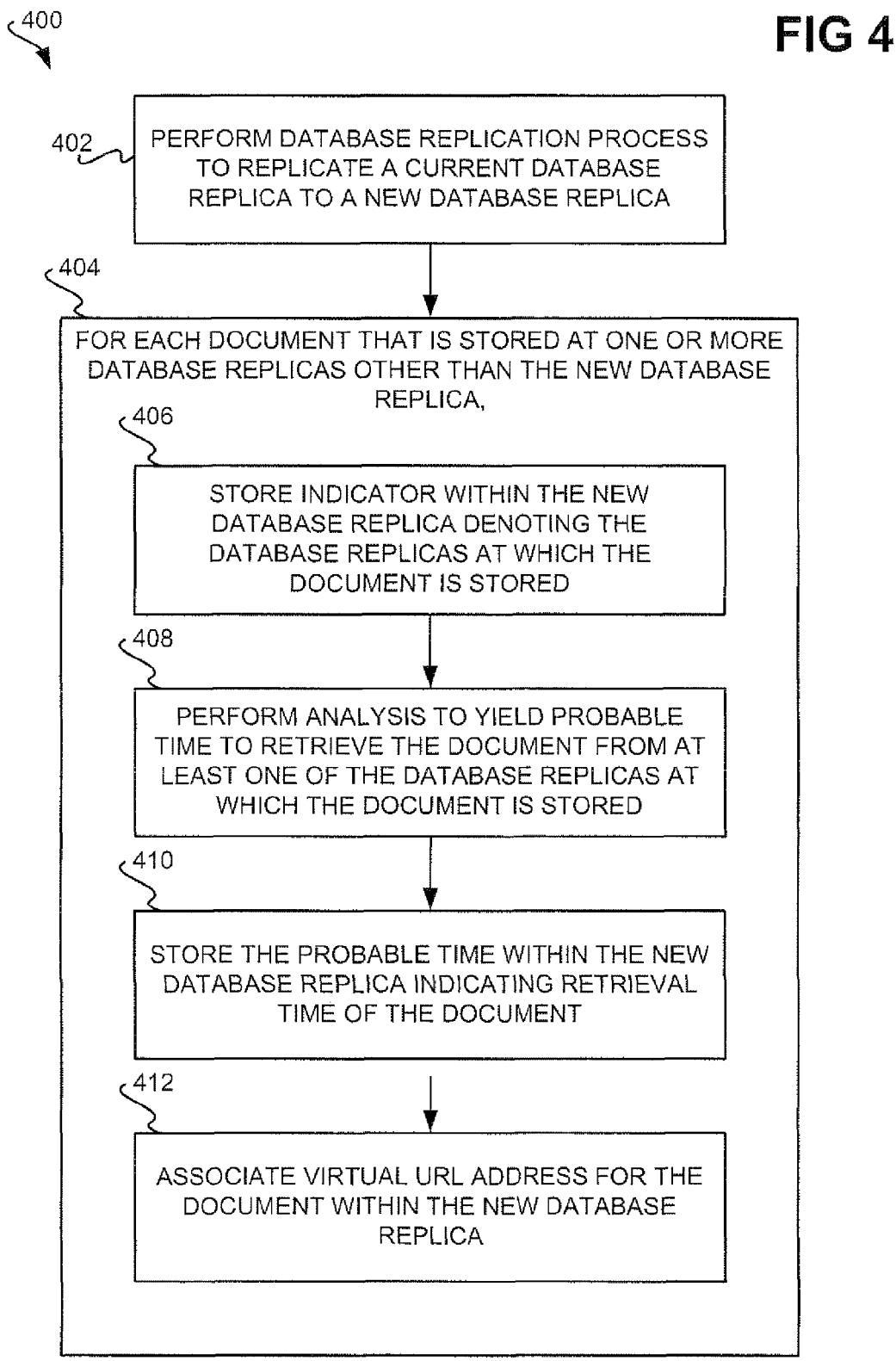
FIG. 4 is a flowchart of a method for replicating a database replica, where the newly replicated database replica virtually stores a document, according to an embodiment of the invention.

FIG. 4 shows a method 400 depicting how a current database replica can be replicated to a new database replica, according to an embodiment of the invention. A database replication process to replicate a current database replica to a new database replica is performed (402). The replication process that is performed may be in accordance with the processes known within the prior art. For example, all the documents actually stored at the current database replica may be copied to the new database replica.

Furthermore, for each document that is stored at one or more database replicas other than the new database replica, the following is performed (404). It is first, however, noted that, the new database replica may receive knowledge of such other documents in a number of different ways. For example, the replication process may involve the current database replica informing the new database replica of documents stored at database replicas other than the current database replica. As another example, the new database replica may request each other database replica for a list of documents stored at these other database replicas.

A locational indicator 202 is stored within the new database replica denoting the database replicas at which the document in question is stored (406). As has been noted, the locational indicator 202 may also or alternatively indicate that the document in question is not actually stored, but rather is virtually stored, at the new database replica. An analysis may be performed to yield a probable time for a client to retrieve the document from at least one of the database replicas at which the document is stored (408). This analysis may be the same as that which has been described in relation to part 312, but not in relation to any particular client, and not based on an existing retrieval time (since no such retrieval time yet exists).

For example, because the analysis may not be performed in relation to any particular client, the analysis may be performed in relation to how long it takes the new database replica to itself retrieve the document from the database replicas at which the document is actually stored. At least the lowest probable retrieval time 204 is then stored within the new database replica (410). A virtual URL address 206 is also associated with the document in question within the new database replica (412). In this way, a new database replica can be replicated from a current database replica, while having the information 200, as has been described in relation to FIG. 2, stored therein.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the invention.

What is claimed is:

1. A method of creating database replicas comprising:
   performing a database replication process to replicate a current database replica to a new database replica;
   for each document of a plurality of documents within the new database replica, as replicated from the current database replica and communicatively connected with the current database replica, where the document is stored at one or more database replicas other than the new database replica:
  storing an indicator within the new database replica for the document denoting the database replicas at which the document is stored; and
  storing within the new database replica an indication of a probable time for a client to retrieve the document from at least one of the one or more database replicas at which the document is stored;
  said storing the indicator and storing the indication of probable time is in a manner enabling, upon opening the new database replica at a server computing device:
  retrieving from the new database replica the indication of probable time to retrieve the document from said at least one of the database replicas;
  performing for each database replica a real-time analysis of parameters in relation to the database replica, based on the retrieved probable time, to yield an updated probable time to retrieve the document from the database replica, wherein the real-time analysis is performed after user selection of the document for opening, and
  wherein said performing includes determining the updated probable time to retrieve the document from each of the database replicas based on one retrieved probable time when the new database replica stores only the indication of the probable time to retrieve from said one database replica, and determining for each of the database replicas a respective updated probable time to retrieve the document based on corresponding retrieved probable time when the new database replica stores for each database replica a respective indication of the probable time to retrieve from that database replica; and
  retrieving the document from the database replica having a lowest updated probable time.

2. The method of claim 1, further comprising, for each document within the new database replica,
  associating a virtual universal resource locator (URL) address for the document, in a manner such that in response to a user selecting the document to signify that the user wants to open the document, the virtual URL address for the document is replaced by an absolute URL address pointing to the document as stored at the database replica having the lowest updated probable time.

3. The method of claim 1, wherein
  performing for each database replica a real-time analysis of the parameters in relation to the database replica comprises performing for each database replica and the new database replica a real-time statistical analysis.

4. The method of claim 1, further comprising updating the indication of probable time stored within the new database replica with the updated probable time to retrieve the document from the database replica.

5. The method of claim 1, further comprising, after opening the current database replica, displaying a plurality of documents, including the document to be opened, referred to within the new database replica.

6. The method of claim 1, further comprising displaying the document for viewing by a user.

7. A computer system comprising:
  a server computing device performing a database replication process to replicate one of a plurality of first database replicas at which a document is stored;
  a server memory having a second database replica resulting from the replication process, the second database replica communicatively connected to the first database replicas, the second database replica storing:
    (i) an indicator for the document denoting the first database replicas at which the document is stored; and
    (ii) an indication of a probable time for a client to retrieve the document from at least one of the first database replicas;
  said storing being in a manner enabling a client to open the second database replica and permit a user to select the document at the second database replica to retrieve the document through the second database replica from one of the first database replicas, by the client retrieving from the second database replica the indication of probable time, and the client performing for each first database replica a real-time analysis of parameters in relation to the first database replica, based on the indication of probable time retrieved, to yield an updated probable time to retrieve the document from the first database replica, wherein the real-time analysis is performed after user selection of the document for opening; and
  wherein said client performing analysis of parameters includes determining the updated probable time to retrieve the document from each of the first database replicas based on one retrieved probable time when the second database replica stores only the indication of the probable time to retrieve from said one first database replica, and determining for each of the first database replicas a respective updated probable time to retrieve the document based on corresponding retrieved probable time when the second database replica stores for each first database replica a respective indication of the probable time to retrieve from that first database replica.

8. The system of claim 7, wherein the second database replica further stores a virtual universal resource locator (URL) address for the document, where the virtual URL address for the document is replaced by an absolute URL address pointing to the document as stored at one of the first database replicas when the user selects to open the document.

9. The system of claim 7, wherein the client updates the indication of probable time within the second database replica with the lowest updated probable time.

10. The system of claim 7, wherein the client is provided with a virtual universal resource locator (URL) address for the document, and in response to a user selecting the document to signify that the user wants to open the document, the virtual URL address for the document is replaced with an absolute URL address pointing to the document as stored within the first database replica having the lowest updated probable time.

* * * * *